(No Model.) 3 Sheets—Sheet 1.
C. K. WELCH.
PNEUMATIC TIRE.
No. 522,814. Patented July 10, 1894.
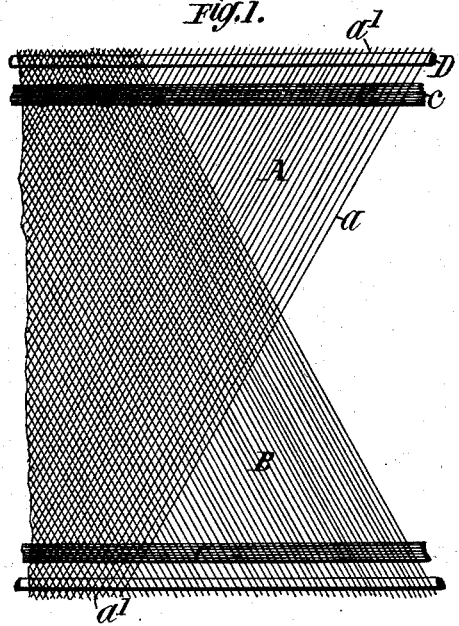
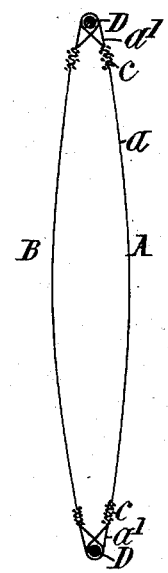
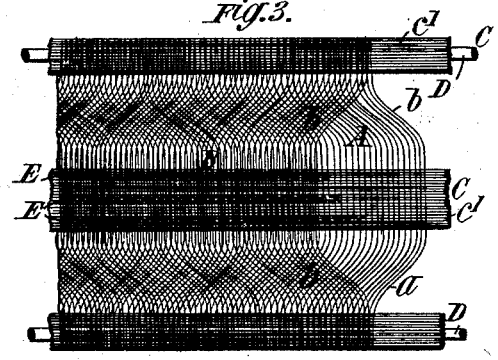
Witnesses:
Raphaël Netter
James N. Cattow
Inventor
Charles K. Welch
by Duncan & Page
Attorneys (No Model.) 3 Sheets—Sheet 2.
C. K. WELCH.
PNEUMATIC TIRE.
No. 522,814. Patented July 10, 1894.
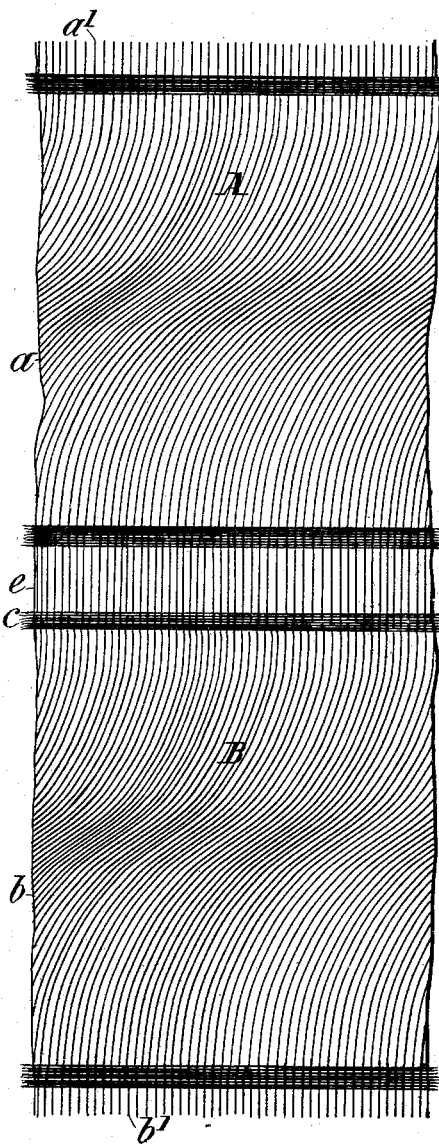
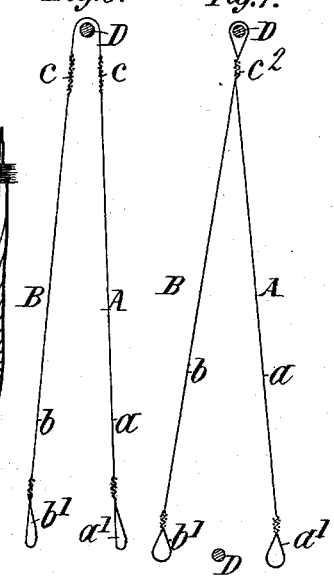
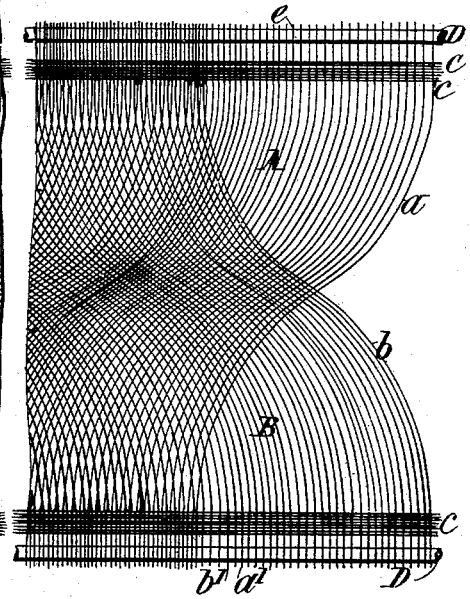
Witnesses:
Raphaël Netter
James N. Catlow
Inventor
Charles K. Welch
by Duncan & Page
Attorneys.

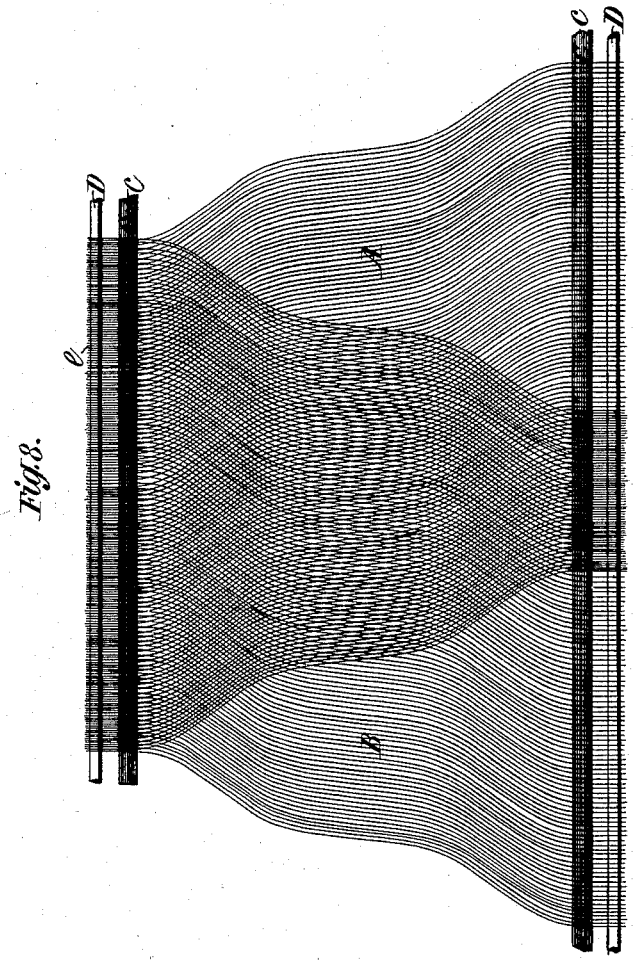

UNITED STATES PATENT OFFICE.

CHARLES KINGSTON WELCH, OF COVENTRY, ENGLAND, ASSIGNOR TO THE PNEUMATIC TYRE COMPANY, LIMITED, OF DUBLIN, IRELAND.

PNEUMATIC TIRE.

SPECIFICATION forming part of Letters Patent No. 522,814, dated July 10, 1894.

Application filed February 10, 1894. Serial No. 499,724. (No model.) Patented in England July 10, 1893, No. 13,391; in France January 9, 1894, No. 235,401, and in Belgium February 9, 1894, No. 108,493.

*To all whom it may concern:*

Be it known that I, CHARLES KINGSTON WELCH, engineer, a subject of the Queen of Great Britain, residing at The Hollies, Eaton Road, Coventry, in the county of Warwick, England, have invented certain new and useful Improvements in Pneumatic Tires for the Wheels of Velocipedes and other Vehicles, of which the following is a specification, reference being had to the accompanying drawings.

I have obtained patents for this invention in the following countries: Great Britain, No. 13,391, filed July 10, 1893; France, No. 235,401, filed January 9, 1894, under the convention and expiring July 10, 1907, and certificate of addition to this patent filed February 9, 1894, and Belgium, No. 108,493, filed February 9, 1894.
This invention relates to pneumatic tires for the wheels of velocipedes and other vehicles, and has for its chief object to provide improved inextensible covers or jackets for the inflatable tube, said covers or jackets being more especially suitable for use with that type of tire which is held in place by endless wire or other inextensible cores.

My invention comprises covers or jackets made of an arched shape and also of a tubular shape. Said covers or jackets when finished and in position on the tire consist of two layers of threads extending transversely across the tire, said threads are sometimes placed obliquely across or in the shape of the letter S, and the several threads of the one layer are at an angle with the threads of the other layer. The threads are maintained in position by means of solution, or by a few circumferential threads extending round the tire interwoven therewith. Said circumferential threads are preferably placed at the edges or edges and tread portion in the case of an arched jacket or at the tread portion in the case of a tubular jacket. The wire or other cores are secured at the edges or sides of the jacket either in a fold of the same or in loops formed in the several cords or threads of which the jacket is composed. The threads composing the jacket are placed close together. Between the two layers of threads I sometimes insert a layer of india-rubber which prevents the said threads from chafing against each other when in use, or the threads may be embedded in rubber by vulcanizing or by solution.

Various methods of constructing the jackets above-described may be used. I will now describe one or two by way of example.

According to one arrangement, I wind cord, thread gut, yarns or similar fibrous or non-fibrous and preferably non-stretching material of any suitable section transversely across two inextensible cores which are held at a suitable distance apart while the said cord or other material is wound thereon. The cord or the like is preferably threaded S-fashion though it may be threaded in any other suitable manner. Each fold or section of the cord is pressed tightly against its neighbor so that when completed the cover consists of the inextensible cores joined by a large number of tightly packed cords or threads. In combination with the transverse threads, I use as above mentioned longitudinal threads which extend circumferentially round the tire when the latter is completed. In this case I prefer to make the cover by weaving yarns in various fashions, and then folding and manipulating the woven fabric in a manner which I will proceed to explain. For example, I weave a tube, having the warp threads omitted at some portions thereof, such portions subsequently forming the sides of the tire. The warp threads strengthen the tire at the tread and where the wires are placed for securing the tire to the rim. This tube is pressed flat so that the warp threads are at the edges and in the center of the two layers of transverse threads. The securing wires or cores are then placed in position in the edges and the two layers solutioned or otherwise joined together. I preferably displace the central portions of the two layers with regard to each other before securing the two layers together so that the transverse threads cross each other at any suitable angle. In other methods of making the covers I weave strips with portions of the warps left out or I weave a tube of large diameter with portions of the weft left out whereby I am enabled to cut endless strips. Said strips are folded over and attached to the inextensible wires or cores in various ways as I will now describe in detail.

In the accompanying drawings, Figure 1 is a view showing a portion of a jacket constructed in accordance with my invention. Fig. 2 is an end view of the same. Fig. 3 shows a similar jacket which is manufactured in a different manner from that shown in Fig. 1. Figs. 4, 5 and 6 are views hereinafter explained of a jacket manufactured in another manner. Fig. 7 is a view similar to Fig. 6 showing a modification. Fig. 8 illustrates a peculiar feature of a jacket constructed in accordance with my invention.

Like letters denote similar parts in all the drawings.

A is one layer of the jacket, B is the other layer, C are the longitudinal or circumferential threads, and D are the wire or other inextensible cores for securing the tire to the rim.

Referring now to Figs. 1 and 2, the two layers of the jacket are woven separately and each consists of weft threads $a$ with a few warp threads $c$ at or near the edges thereof so that loops as at $a'$, $a'$ are formed at each edge. Two such pieces of fabric are placed one on the top of the other and their edges are displaced so that the weft threads of each are oblique and cross each other at an angle as shown in Fig. 1. The cores D are then threaded through the loops at the edges being inserted alternately through the loops in each layer of fabric. The two pieces of fabric are thereby united by their edges as shown in Fig. 2. The two layers may be further treated with india-rubber solution so as to form a single piece of fabric having cores in its edges.

In Fig. 3 a jacket is shown which is practically the same as that shown in Fig. 1 but which is made in a different manner. The fabric here consists of a woven tube having weft threads $a$, $b$ which form a spiral. The warp threads of said tube are few in number and are inserted at the places shown. When the tube is flattened the warp threads $c'$ in the center are brought together and the weft threads are displaced longitudinally at the center so as to be disposed in S-fashion as shown. The two cores D are then inserted in the fold at the edges and the two layers are solutioned or cemented together. In some cases I sew the two central portions of the two layers together as shown at E in the drawings, or said central portions may be merely united by india-rubber solution. The jacket thus made consists of two layers of threads which cross each other and are reinforced by longitudinal threads at the center and edges. I sometimes dispense with the central warp threads, and further, the warp threads at the edges may be woven in such a manner with the weft as to form continuous loops or pockets for the reception of the inextensible cores.

In Figs. 5 and 6 I show a fabric which is practically the same as that shown in Figs. 1 and 2 but made in another manner. The fabric is woven in one piece with weft threads $a$ and $b$ held together by a few warp threads at $c$, $c$. The weft threads $a$, $b$ are really continuous as was the case with the fabric shown in Fig. 3 but I wish to distinguish the two halves of the fabric which will ultimately form the two layers of the jacket, by different letters. The fabric thus consists of straight weft threads forming loops $a'$, $b'$ at the edges and maintained in position by a few warp threads. The edges of the fabric are now displaced so as to bend the weft threads into the shape shown in Fig. 4. The fabric is then bent over so as to form two layers and one of the cores is threaded through the loops $a'$, $b'$, alternately as shown in Figs. 5 and 6. The core on the opposite edge is simply inserted in the central fold of the fabric as at $e$, or it may be inserted through the threads $e$ alternately so as to be held in position. The two layers are preferably solutioned together to form a single piece.

The jacket shown in Fig. 5 may be woven in two layers instead of being folded in the middle as is shown in the end view Fig. 7. On comparing Fig. 6 with Fig. 7 it will be seen that the warp threads $c^2$ Fig. 7 correspond to the threads $c$ near the fold in Fig. 6 but in Fig. 7 the two layers of the jacket are shown as being united by the warp threads whereas in Fig. 6 this is not the case.

It is easily seen that the jacket shown in Fig. 5 is practically the same as that shown in Fig. 1 the difference being that the two layers of Fig. 5 are formed of one and the same piece of fabric, whereas in Fig. 1 the two layers are manufactured separately.

In order to make the jacket shown in Figs. 1, 3 and 5 into continuous rings the ends of the layers must be joined. This presents no difficulty and it will be easily seen that at the lapped joint the jacket will not be thicker than at any other part of the jacket, that is to say, the joint will consist of two layers of threads solutioned together like the remaining portion of the jacket. This is easily seen from Fig. 8 which shows a piece of fabric folded over in the middle at $e$ so as to form two layers A and B. The edges of the strip are displaced as clearly shown, thereby causing the threads of the two layers to cross each other at an angle as is also shown in Fig. 5. It results from this that at each end of the band an approximately triangular piece which is only one layer thick is formed, consequently when these ends are lapped to form the continuous jacket the joint is only of the same thickness as the remaining part of the jacket.

In another method of weaving the fabric the threads which will ultimately extend transversely across the tire are the warp threads and they are maintained in position by a small number of weft threads. In this case the fabric is woven to the form of a tube which is approximately of the same diameter as the wheel to which the jacket is to be applied. Transverse strips are cut from such a tube and the edges of such strips are displaced and then turned over so as to form two layers of transverse threads which cross at a suitable angle. This may be seen from considering Fig. 5 taking into account the fact that the threads $a$ and $b$ are now supposed to be warp threads and $c$ weft threads and also that the loops $a'$, $b'$ are non-existent. The core which previously extended through the loops $a'$ and $b'$ is now folded up in the edge of the fabric the two layers of which are united by solution.

I may make the joint between the edges of the fabric to occur at the middle or tread portion of the jacket instead of at the edge if it is desired. Such methods of folding are well known when applied to ordinary woven fabric but when used with such fabric as that hereinabove described the edges of the fabric are displaced so as to cause the threads thereof to cross each other as shown in the drawings.

Instead of solutioning or otherwise uniting the two layers of fabric to form an arched jacket I sometimes place the air tube between the said layers which then form a tubular jacket. Two such tubular jackets may be used the threads being displaced so as to cross each other at any suitable angle. In the case where a jacket such as that shown in Fig. 5 is used as a tubular jacket the core D is preferably threaded alternately through the loops $e$ at the center of the fabric.

The jacket constructed as above described may be vulcanized either to the air tube or the outer cover or to both if desired, a single tube tire being formed in the latter case.

What I claim is—

1. The combination in a jacket for pneumatic tires, of two layers of transverse threads crossing at an angle, longitudinal threads interwoven with those of each layer along the edges and in sufficient number only to retain the transverse threads in position, and inextensible wires or cores contained in loops formed along the edges of the jacket, as set forth.

2. In a pneumatic tire the combination with the air tube of an arched jacket consisting of two layers of threads extending across the tire, the threads in one layer being at an angle with the threads in the other layer, inextensible cores or wires contained in loops formed at the edges of the jacket and longitudinal threads interwoven with the transverse threads of each layer along the edges of the jacket and in sufficient number only to retain the transverse threads in position as set forth.

3. In a pneumatic tire, the combination with the air tube, of an arched jacket consisting of two layers of threads extending transversely across the tire, the threads in one layer being at an angle with the threads in the other layer, longitudinal threads at the tread portion and near the edges of the jacket interwoven with said transverse threads, and inextensible cores contained in the loops formed at the edges of the jacket for holding the tire to the rim, substantially as described.

4. In a pneumatic tire, the combination with the air-tube, of an arched jacket consisting of two layers of threads extending transversely across the tire, the threads in one layer being at an angle with the threads in the other layer, longitudinal threads at the tread portion and near the edges of the jacket interwoven with said transverse threads, a layer of india-rubber interposed between the two layers of transverse threads and solutioned thereto, and inextensible cores contained in the loops formed at the edges of the jacket for holding the tire to the rim, substantially as described.

5. In a pneumatic tire, the combination with the air-tube, of an arched jacket consisting of two layers of threads extending transversely across the tire, the threads in one layer being at an angle with the threads in the other layer, longitudinal threads at the tread portion and near the edges of the jacket interwoven with said transverse threads, a layer of india-rubber interposed between the two layers of transverse threads and solutioned thereto, and endless inextensible cores contained in the loops formed at the edges of the jacket for holding the tire to the rim, substantially as described.

6. In a pneumatic tire, the combination with the air-tube, of an arched jacket having no transverse joint and consisting of two layers of threads extending transversely across the tire, the threads in one layer being at an angle with the threads in the other layer, longitudinal threads at the tread portion and near the edges of the jacket interwoven with said transverse threads, a layer of india-rubber interposed between the two layers of transverse threads and solutioned thereto, and endless inextensible cores contained in the loops formed at the edges of the jacket for holding the tire to the rim, substantially as described.

7. In a pneumatic tire, the combination with the air-tube, of an arched jacket vulcanized thereto and consisting of two layers of threads extending transversely across the tire, the threads in one layer being at an angle with the threads in the other layer, longitudinal threads at the tread portion and near the edges of the jacket interwoven with said transverse threads, a layer of india-rubber interposed between the two layers of transverse threads and solutioned thereto, and inextensible cores contained in the loops formed at the edges of the jacket for holding the tire to the rim, substantially as described.

In testimony whereof I have hereunto set my hand this 26th day of January, 1894.

CHARLES KINGSTON WELCH.

Witnesses:
FREDERICK WILLIAM LE TALL,
THOMAS LAKE.